United States Patent [19]

Becker et al.

[11] Patent Number: 4,983,066

[45] Date of Patent: Jan. 8, 1991

[54] FORM-FITTED CONNECTION BETWEEN TWO SHEET METAL ELEMENTS OF A VEHICLE AND METHOD FOR ITS MANUFACTURE

[75] Inventors: Karin Becker, Rockenhausen; Dieter Braun, Braunschweig; Gerd Edel, Pirmasens, all of Fed. Rep. of Germany

[73] Assignee: Keiper Recaro GmbH & Co., Fed. Rep. of Germany

[21] Appl. No.: 354,357

[22] Filed: May 19, 1989

[30] Foreign Application Priority Data

May 19, 1988 [DE] Fed. Rep. of Germany ....... 3817079

[51] Int. Cl.⁵ .............................................. F16B 5/04
[52] U.S. Cl. .................................... 403/274; 403/285; 29/513
[58] Field of Search ............... 403/274, 279, 278, 282, 403/281, 284, 285, 364; 29/513

[56] References Cited

U.S. PATENT DOCUMENTS

| 2,160,598 | 5/1939 | Melrath | 29/513 |
| 2,834,623 | 5/1958 | Doering et al. | 403/274 X |
| 3,661,235 | 5/1972 | Harrison | 29/513 X |
| 4,233,726 | 11/1980 | Williams | 403/274 X |
| 4,652,169 | 3/1987 | Matthews | 403/282 X |

Primary Examiner—Peter M. Cuomo
Attorney, Agent, or Firm—Wigman & Cohen

[57] ABSTRACT

In a form-fitted connection for transferring moments of torque between two sheet metal elements of a vehicle, particularly a seat of a motor vehicle, both elements have respective tooth gaps (12) formed by bent tongues between any two successive teeth (5) in the area of their edge zones to be connected with each other, into which tooth gaps the respective teeth (5) of the other element (1) engage. At least on the one of the two elements to be secured against sliding in the longitudinal direction relative to the other element (1), at least one of the teeth (5) is bent in the same direction as its adjacent tongues into a position where it engages behind the other element (1).

5 Claims, 3 Drawing Sheets

FORM-FITTED CONNECTION BETWEEN TWO SHEET METAL ELEMENTS OF A VEHICLE AND METHOD FOR ITS MANUFACTURE

BACKGROUND OF THE INVENTION

1. Field of the Invention

This invention relates to a form-fitted connection for the transfer of moments of torque between two sheet metal elements of a vehicle, and more particularly to a seat of a motor vehicle, in which the two elements are brought into contact along their edge zones, and the edge zone of one element has teeth that are spaced from each other and engage in tooth gaps of the edge zone of the other element, as well as to a method of producing such a connection.

2. Description of the Prior Art

In automobile construction, sheet metal elements are normally screwed together, or if necessary for reasons arising from requirements for strength, manufacturing concerns or safety, they can be welded together. The heat distortion inherent in welding can cause problems, however, and can necessitate a straightening before further processing. In addition, it can be necessary to subject the welded elements to a heat treatment in order to achieve a sufficiently high degree of fatigue endurance.

It is also known to connect elements of this type by means of a groove and spring, or by providing teeth on one element that engage in grooves in the other element. These connections, however, generally cannot be used in place of welded connections, both for cost reasons and due to the magnitudes of the forces they must bear.

SUMMARY AND OBJECTS OF THE INVENTION

In view of the foregoing limitations and shortcomings of the prior art devices, as well as other disadvantages not specifically mentioned above, it is a primary objective of the invention to provide a form-fitted connection between two sheet metal elements in a motor vehicle that can replace a welded connection both with regard to cost and to load-bearing ability.

Briefly described, the aforementioned object is accomplished according to the invention by providing two sheet metal elements which are brought into contact along their edge zones, with the edge zone of one element having teeth that are spaced from each other and engage in tooth gaps of the other element. Both of said elements have, in the area of their edge zones, tooth gaps formed by respective bent tongues between any two adjacent teeth, and one of the teeth of the respective opposed element engages in each of said tooth gaps of said elements. At least on the one of the two elements to be secured against sliding in the longitudinal direction of its teeth relative to the other element, at least one of the teeth of said one element is bent in the same direction as its adjacent tongues into a position where it engages behind the other element.

Because both elements are provided with teeth that engage in the gaps between the teeth in the other element, the load-bearing capacity in the direction of the row formed by the teeth is almost doubled in comparison to a connection in which only one element has teeth that engage in grooves in the other element. The load-bearing capacity is therefore no less than that of a welded connection. But it does have a number of advantages over a welded connection. For example, heat distortion and heat treatment are eliminated In addition, the evidence of the reliability of the connection need only be demonstrated once, instead of through a statistical safeguard, as is necessary for welded connections. An additional advantage is the greater elasticity under fatigue loading, thereby preventing endurance fractures. The significantly greater load-bearing capacity and the negligible material losses are also advantageous relative to known sheet metal connections with teeth that engage in grooves. Finally, it is also simple to secure both elements against relative movement in the longitudinal direction of the teeth by bending one or all of these teeth so as to enable them to engage behind the other element. As compared to a welded connection, in some instances it is also advantageous that the connection can be released without destroying the elements, because the bent teeth only need to be bent back out of the way.

The connection can be produced without any play in the direction of the rows formed by the teeth, if the teeth and the grooves that receive them are shaped appropriately. If the tongues are made to rest on one side of the opposite element while the bent teeth rest on the other side thereof, then the result is a connection that is free of play in the direction in which the teeth extend.

The connection according to the invention can be employed with particular advantage if the two elements are formed such that the element to be secured against sliding in the longitudinal direction of its teeth relative to the other element has a cylindrical, preferably a round cylindrical edge zone, and the tooth gaps of the other element lie in a corresponding surface. This embodiment can bear very large moments of torque.

Another object of the invention is to provide a method of producing the connection according to the invention that makes it possible to produce this connection economically. This object is achieved by a method in which the material sections provided as teeth are separated from the material sections provided as torques by cuts, the material sections that form tongues are bent in a direction that allows them to contact the other element while forming respective tooth gaps, the teeth of one element are inserted into the tooth gaps in the other element, and thereafter, at least one tooth in the element to be secured against sliding in the longitudinal direction of its teeth relative to the other element is bent in the same direction as the tongues adjacent to it into a position where it engages behind the other element.

One advantageous variation of this method includes bringing all material sections that form tongues into a position that allows simultaneous contact with the other element.

Another advantageous variation of this method includes inserting the teeth of one element into the tooth gaps of the other element sufficiently far so that both elements abut the material sections that form tongues, and in that subsequently the teeth provided to engage behind the other element are bent until they contact the respective other element.

With the foregoing and other objects, advantages and features of the invention that will become hereinafter apparent, the nature of the invention may be more clearly understood by reference to the following detailed description of the invention, the appended claims

DETAILED DESCRIPTION OF A PREFERRED EMBODIMENT

Figure 1:
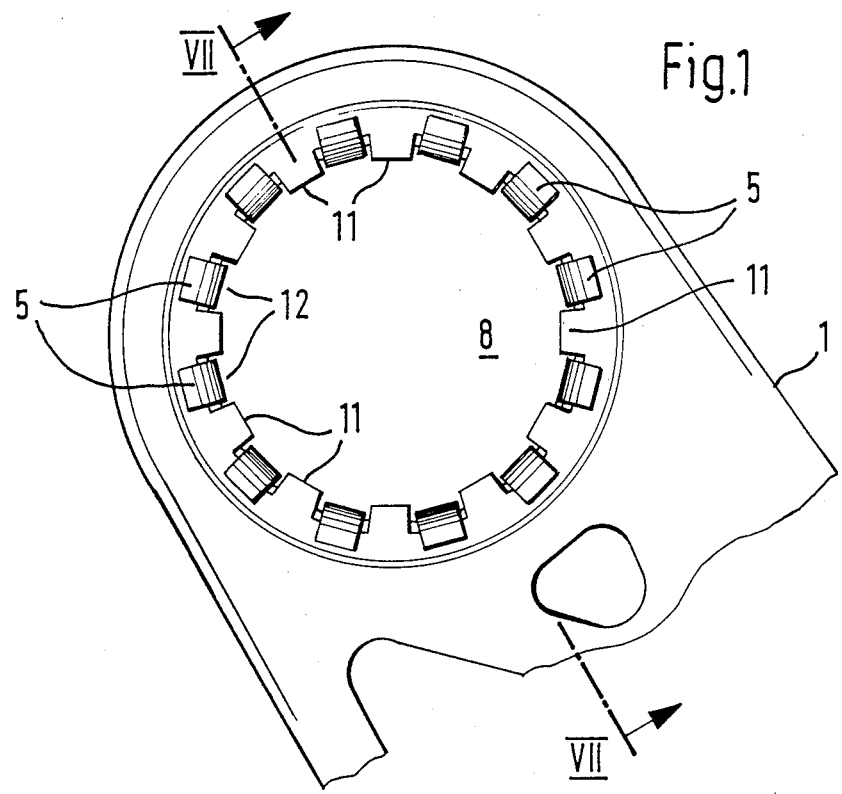
FIG. 1 is a top view of the exemplary embodiment in the finished condition and one of the two elements that are connected together.
Figure 2:
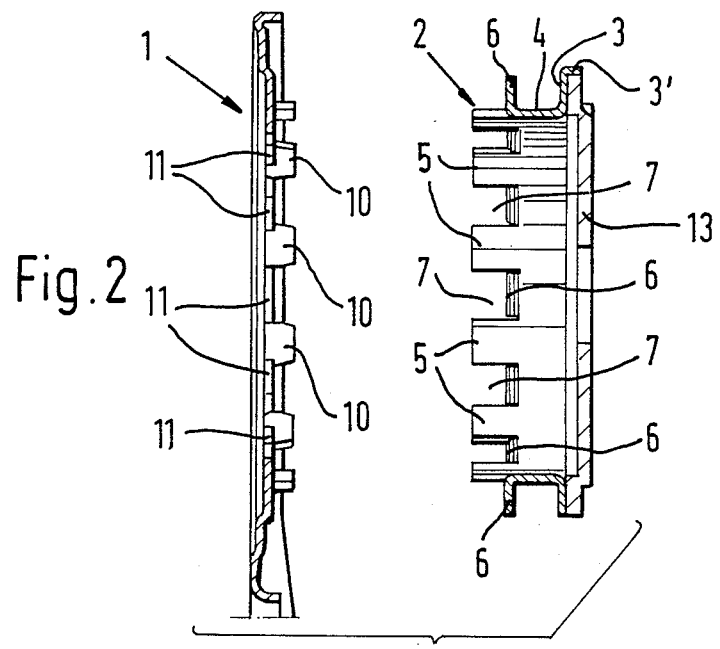
FIG. 2 is a longitudinal section through the two elements to be connected, before the connection is begun to be produced.

Referring now in detail to the drawings wherein like parts are designated by like reference numerals throughout, there is illustrated in FIG. 1 an apparatus which is used in order to connect a hinge fitting containing a self-arresting transmission to a sheet metal side plate 1 of the seat frame of a vehicle seat, which hinge fitting is connected on one side to the side beam of the back rest and on the other side to the side plate 1. An adapter 2 is provided that is also made of sheet metal and, as shown in FIG. 2, has a cylindrical portion 4 adjacent to a flange element 3. The flange element 3 serves to provide the connection with fitting element 13 of the hinge fitting, which abuts the flange element 3. The fitting element 13 has spur gear teeth along its periphery. Respective tongues 3' that are formed on the flange element 3 and project axially therefrom engage without play in the respective tooth gaps.

The end portion of the cylindrical part 4 of the adapter 2 opposite the flange element 3 is provided with cuts that run parallel to the longitudinal axis. These cuts separate the teeth 5 from the tongues 6. The tongues 6 are bent outward to form teeth gaps 7, and thereby define surfaces parallel to the flange element 3. Accordingly, the axial spacing of the side plate 1 from the fitting element 13 can be established with great precision with the aid of the adapter 2. The teeth 5 and the tooth gaps 7 preferably have the same width.

The edge zone of the side plate 1 to be connected with the adapter 2, which edge zone lies in a plane on which the outer surface of the element 4 of the adapter 2 stands perpendicularly, borders a circular opening 8, which has a diameter somewhat smaller than the inside diameter of the cylindrical portion 4 of the adapter 2. The tongues 10, which have nearly parallel sides, are separated from the trapezoidal teeth 11 by the cuts, which run nearly radially. The tongues 10 are bent at right angles toward the adapter 2, forming a tooth gap 12 between any two adjacent teeth 11, the width of which is adapted to the width of the teeth 5 of the adapter. The depth of the cuts thereby is selected such that the inner surfaces of the tongues 10, in their bent condition, define a cylindrical surface into which the teeth 5 of the adapter 2 can be introduced without play.

Figure 3:
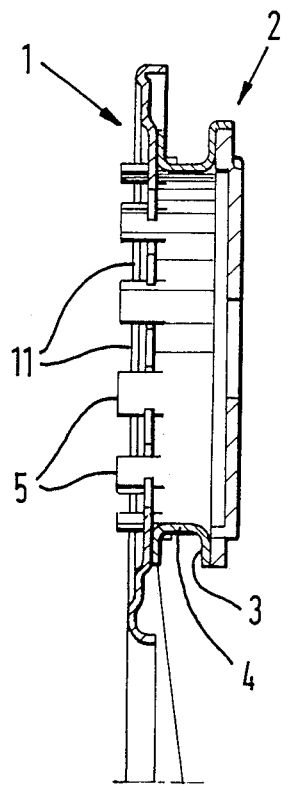
FIG. 3 is a longitudinal section through the two elements to be connected with each other, at a stage where the connection has been partially completed.
Figure 4:
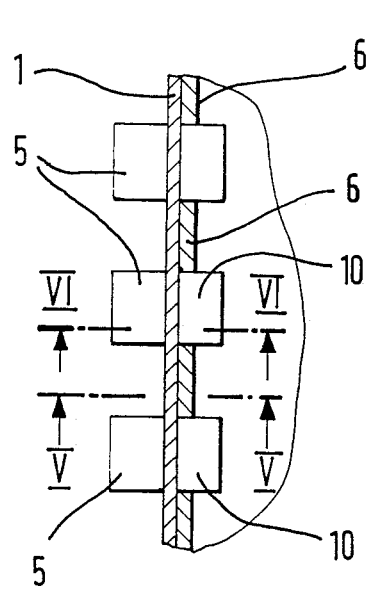
FIG. 4 is a partial section, illustrated as a further development, along a surface lying concentric to the outer surface of one element, through the two elements in the condition of the connection illustrated in FIG. 3.
Figure 6:
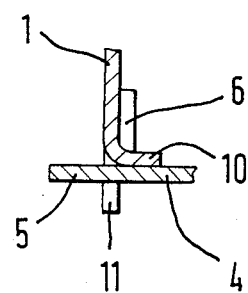
FIG. 6 is a section according to the line VI—VI in FIG. 4.
Figure 5:
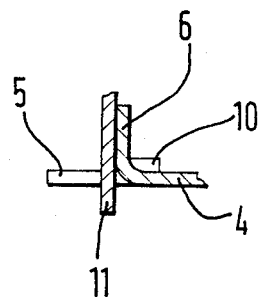
FIG. 5 is a section according to the line V—V in FIG. 4.
Figure 7:
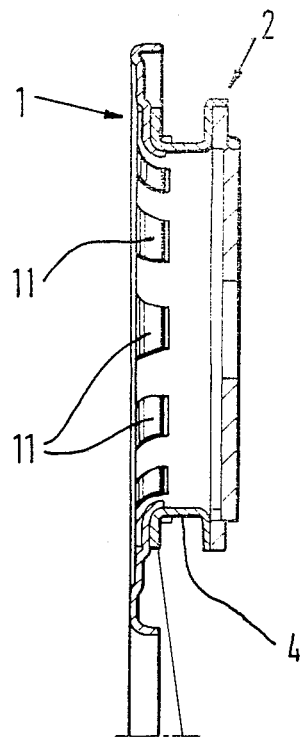
FIG. 7 is a longitudinal section through the two elements after the connection has been completed.

As shown in FIG. 3, the teeth 5 of the adapter 2 are aligned with the tooth gaps 12 of the side plate 1 and can be pushed into these gaps until the tongues 6 of the adapter abut the side plate 1. The relative positions of the teeth 5 and the tongues 6 of the adapter 2, and of the teeth 11 and the tongues 10 of the side plate 1 ar clearly illustrated in FIGS. 5 and 6. In addition, FIG. 4 shows how the teeth of the side plate 1 engage without play between the tongues 6 of the adapter 2.

Figure 8:
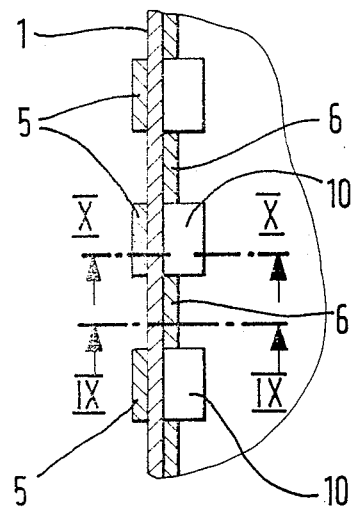
FIG. 8 is a partial section, shown as a further development, along a surface that is concentric to the outer surface of one element, after the connection is complete.
Figure 10:
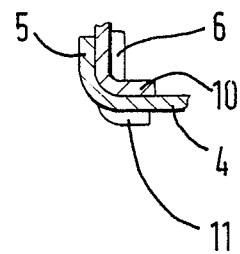
FIG. 10 is a section according to the line X—X in FIG. 8.
Figure 9:
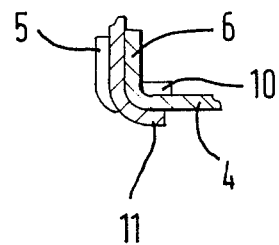
FIG. 9 is a section according to the line IX—IX in FIG. 8.

Subsequently, all of the teeth 5 of the adapter 2 are bent outwardly in the same manner as the tongues 6, and are brought into contact against the outside of the side plate 1 opposite the adapter 2, as shown in FIGS. 8 through 10. In addition, the teeth 11 of the side plate 1 are bent in the same manner as the tongues 10, and are brought into contact against the inner cover surface of the cylindrical element 4 of the adapter 2. This position of the tongues 6 and 10, and of the teeth 5 and 11, is shown especially clearly by FIGS. 8 through 10. The bent teeth 5 and 11 prevent a release of the connection between the side plate 1 and the adapter 2, thus giving the connection a relatively high axial load-bearing capacity. Due to the reciprocal engagement of the teeth 5 and 11 in the tooth gaps in the respectively opposite element, the force resulting from the occurring torques can be transferred without problem, although it is significantly larger, due to the smaller distance from the axis of rotation, than the force to be transferred by the tongues 3'.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A form fitted connection for the transfer of moments of torque between two sheet metal elements of a vehicle, one of said elements having a flat shape and the other of said elements having a cylindrical shape in an area of said connection, particularly for a seat of a motor vehicle, in which the two elements are brought into contact along their edge zones, and the edge zones of one element has teeth that are spaced from each other and engage in tooth gaps of the edge zone of the other element, wherein:

said element having a flat shape is provided with a circular opening having a border which has a diameter smaller than an inside diameter of said cylindrically shaped element the border of the opening of the flat shaped element is formed by tongues and teeth, which tongues are bent at right angles to form a cylindrical surface for centering an outer surface of the cylindrically-shaped element;

said cylindrically-shaped element is provided, at the end of said element to be connected with said flat shaped element, with teeth and tooth gaps formed by outwardly bent tongues, which tongues contact a flat surface of said flat shaped element and locate the axial position of the cylindrically-shaped element relative to the flat surface of the flat shaped element;

both of said elements have, in the area of their edge zones, tooth gaps formed by respective bent tongues between any two adjacent teeth, and one of the teeth of the respective opposed element engages in each of said tooth gaps of said element; and wherein at least on the one of the two elements to be secured against sliding in the longitudinal direction of its teeth relative to the other element, at least one of the teeth of said one element is bent in the same direction as its adjacent tongues into a position where it engages behind the other element; and at least some of the teeth of the cylindrically-shaped element are bent outwardly so that they contact one flat surface of the flat shaped element and the tongues of the cylindrically-shaped element contact the opposed flat surface of the flat shaped element; and at least some of the teeth of the flat shaped element are bent at a right angle so that they contact an inner surface of the cylindrically-shaped element.

2. The connection according to claim 1, wherein the tooth gaps are formed with parallel sides.

3. A method for the manufacture of a connection according to claim 1, wherein
    (a) on both elements, along the edge zones to be connected with each other, the material sections provided as teeth are separated from the material sections provided as tongues by cuts;
    (b) the material sections that form tongues are bent in a direction that allows them to contact the other element while forming respective tooth gaps;
    (c) the teeth of one element are inserted into the tooth gaps in the other element; and
    (d) thereafter, at least one tooth in the element to be secured against sliding in the longitudinal direction of its teeth relative to the other element is bent in the same direction as the tongues adjacent to it into a position where it engages behind the other element.

4. The method according to claim 3, wherein all material sections that form tongues are brought into a position that allows simultaneous contact with the other element.

5. The method according to claim 4, wherein the teeth of one element are inserted into the tooth gaps in the other element sufficiently far so that both elements abut the material sections that form the tongues, and in that subsequently the teeth provided to engage behind the other element are bent until they contact the respective other element.

* * * * *